United States Patent
Gross

(10) Patent No.: US 9,882,661 B1
(45) Date of Patent: Jan. 30, 2018

(54) CLOSED LOOP CALIBRATION BY FREQUENCY SEPARATION

(71) Applicant: INTEL IP CORPORATION, Santa Clara, CA (US)

(72) Inventor: Shahar Gross, Nes-Tziona (IL)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/388,289

(22) Filed: Dec. 22, 2016

(51) Int. Cl.
*H04L 1/20* (2006.01)
*H04B 17/14* (2015.01)
*H04L 27/00* (2006.01)

(52) U.S. Cl.
CPC ......... *H04B 17/14* (2015.01); *H04L 27/0014* (2013.01); *H04L 2027/0016* (2013.01)

(58) Field of Classification Search
USPC .......................... 375/224, 296; 455/88, 67.14
See application file for complete search history.

(56) References Cited

U.S. PATENT DOCUMENTS

| | | | |
|---|---|---|---|
| 7,242,912 B2 * | 7/2007 | Maligeorgos | H03L 7/085 455/260 |
| 9,749,068 B2 * | 8/2017 | Khoshgard | H04B 17/21 |
| 2006/0009180 A1 | 1/2006 | Xu et al. | |
| 2014/0242918 A1 * | 8/2014 | Weissman | H01Q 3/26 455/67.14 |
| 2014/0376673 A1 | 12/2014 | Wang et al. | |
| 2015/0030103 A1 * | 1/2015 | Hormis | H04L 1/243 375/296 |
| 2016/0359614 A1 * | 12/2016 | Hao | H04L 7/033 |

* cited by examiner

*Primary Examiner* — Eva Puente
(74) *Attorney, Agent, or Firm* — Eschweiler & Potashnik, LLC

(57) ABSTRACT

Methods and systems for calibrating a transceiver using frequency separation are disclosed. A method configured to calibrate a transceiver that includes connecting an output of a transmitter to an input of a receiver. A receiver local oscillator signal having a receiver local oscillator frequency ($f_{RXLO}$) is provided to a receiver mixer. A transmitter local oscillator signal having a transmitter local oscillator frequency ($f_{TXLO}$) to is provided to a transmitter mixer. The receiver local oscillator frequency is separated from the transmitter local oscillator frequency by a nonzero intermediate frequency ($f_{IF}$). The method includes upconverting a test signal having a baseband frequency ($f_{BB}$) using the transmitter mixer and downconverting the output signal of the transmitter mixer with the receiver mixer to generate a calibration signal. The transceiver is calibrated based on the calibration signal.

21 Claims, 3 Drawing Sheets

US 9,882,661 B1

CLOSED LOOP CALIBRATION BY FREQUENCY SEPARATION

FIELD

The present disclosure relates to the field of transceivers and in particular to calibration of wireless receivers.

BACKGROUND

Wireless transceivers are calibrated to compensate for errors introduced by the electronic signal processing components in the transceivers. During closed loop calibration, a signal having some known properties is injected into the transmitter. The transmit signal generated by the transmitter is input, or looped back, to the receiver. The "calibration signal" generated by the receiver in response to the looped back signal is used to determine errors introduced into the transceiver by the various transceiver components. Adjustments are made to components in the transceiver based on the determined errors.

For example, adjustments may be made to digital pre-distortion circuitry that pre-distorts the signal provided to the transmitter and post-distortion circuitry that post-distorts the signal output by the receiver. The pre-distortion circuitry includes components that adjust the gain and/or phase of the signal provided to the transmitter to compensate for the errors that will be introduced into the signal by the transmitter. The post-distortion circuitry includes components that adjust the gain and/or phase of the signal output by the receiver to compensate for the errors that were introduced into the signal by the receiver.

One type of error experienced by quadrature transceivers is IQ mismatch. The quadrature receiver downconverts a quadrature baseband signal from a radio frequency (RF) signal to a quadrature baseband signal. More specifically, the receiver includes a mixer that mixes the RF signal with an in-phase component of a local oscillator signal to downconvert the radio frequency signal to an in-phase component (i.e., the "I" signal) of the quadrature baseband signal. The mixer also mixes the RF signal with a quadrature component of the local oscillator signal to downconvert the radio frequency signal to a quadrature component (i.e., the "Q" signal) of the quadrature baseband signal. The I signal and the Q signal are processed on separate paths of components within the receiver before being recombined for demodulation.

However, the gain of the components in the I path and the Q path may not match exactly. As a result, a gain error is introduced into the quadrature baseband signal. In addition, the in-phase component and the quadrature component of the local oscillator signal used by the mixer for downconversion may not be exactly ninety degrees out-of-phase. As a result, a phase error, or quadrature error, is introduced into the quadrature baseband signal. Combined, the gain and quadrature errors form an I/Q mismatch error in the receiver. It is desirable to correct the I/Q mismatch of the receiver in baseband in order to provide improved performance.

BRIEF DESCRIPTION OF THE DRAWINGS

Some examples of circuits, apparatuses and/or methods will be described in the following by way of example only. In this context, reference will be made to the accompanying Figures.

DETAILED DESCRIPTION

Closed loop calibration is often used to calibrate transceivers to reduce or mitigate different types of errors. One advantage of closed loop calibration is that it does not require any external equipment. This means that closed loop calibration can be triggered periodically during transceiver operation in response to temperature changes or other changes that might result in component drift. One problem with closed loop calibration is that both receiver and transmitter components introduce errors into the signal that is used for calibration. Additional processing is performed to separate the transmitter related errors from the receiver related errors so that appropriate adjustments may be made to pre-distortion and post-distortion circuitry. This may include performing additional calibration iterations or using complex components that are very sensitive to RF impairments.

During typical closed loop calibration, when a base band signal at frequency $f_{BB}$ passes through a transmitter component with IQ impairment and is up-converted to a pass band frequency $f_{RF}$, the "wanted" (or main or intended) signal is at frequency $f_{RF}+f_{BB}$ and a transmit (TX) "image" signal (hereinafter "TX IQ) is created at frequency $f_{RF}-f_{BB}$. In the receiver the looped back distorted signal is being downconverted with the same pass band frequency and the receiver (RX) image (hereinafter RX IQ) is also created at frequency $f_{RF}-f_{BB}$. Because both images are created at the same frequency, it is difficult to determine which image components were created by the transmitter as opposed to the receiver.

The described methods and systems use at least two different local oscillator frequencies for the transmitter and receiver during calibration. This causes the image generated by the receiver impairments to occur at a different frequency than the image created by the transmitter impairments. Thus the calibration signal has separate TX and RX image components, greatly simplifying the calibration process.

Figure 4:
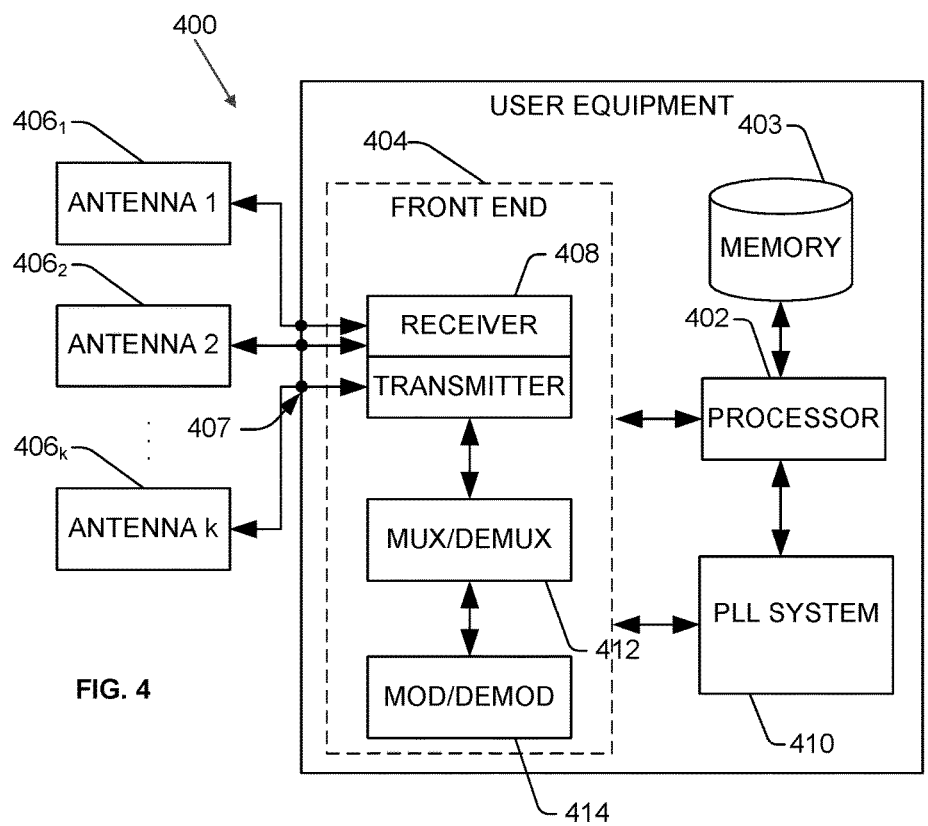
FIG. 4 illustrates an example device configured to calibrate a receiver using a receiver local oscillator signal that is different from a transmitter local oscillator signal, according to one exemplary implementation of the disclosure.

Turning first to FIG. 4, to provide context for various aspects of the disclosed subject matter, FIG. 4 illustrates a block diagram of an exemplary implementation of wireless communication device 400 (e.g., smartphone, computer, cable modem or gateway, etc.) that can enable and/or exploit features or aspects of the disclosed aspects. The device 400 can be utilized with one or more aspects of the disclosed closed loop calibration using different TX LO signal frequency and RX LO signal frequency. The user device 400, for example, comprises a digital baseband processor 402 that can be coupled to a data store or memory 403, a front end 404 (e.g., an RF front end, an acoustic front end, or the other like front end) and a plurality of antenna ports 407 for connecting to a plurality of antennas 406₁ to 406_K (K being a positive integer). The antennas 406₁ to 406_K can receive and transmit signals to and from one or more wireless devices such as access points, access terminals, wireless ports, routers and so forth, which can operate within a radio access network or other communication network generated via a network device (not shown).

The device 400 can be a radio frequency (RF) device for communicating RF signals, an acoustic device for communicating acoustic signals, or any other signal communication device, such as a computer, a personal digital assistant, a mobile phone or smart phone, a tablet PC, a modem, a notebook, a router, a switch, a repeater, a PC, network device, base station or a like device that can operate to communicate with a network or other device according to one or more different communication protocols or standards.

The front end 404 can include a communication platform, which comprises electronic components and associated circuitry that provide for processing, manipulation or shaping of the received or transmitted signals via one or more receivers or transmitters (e.g. transceivers) 408, a mux/demux component 412, and a mod/demod component 414. The front end 404 is coupled to the digital baseband processor 402 and the set of antenna ports 407, in which the set of antennas 406₁ to 406_K can be part of the front end. The front end 404 may be configured to perform receiver calibration using transmitter power amplifier self-noise. In one aspect, the user equipment device 400 can comprise a phase locked loop system 410.

The processor 402 can confer functionality, at least in part, to substantially any electronic component within the mobile communication device 400, in accordance with aspects of the disclosure. As an example, the processor 402 can be configured to execute, at least in part, executable instructions that cause the device perform closed loop calibration using different TX LO signal frequency and RX LO signal frequency. Thus the processor 402 may embody various aspects of the mode control circuitry of FIGS. 1 and 2, as a multi-mode operation chipset.

The processor 402 is functionally and/or communicatively coupled (e.g., through a memory bus) to memory 403 in order to store or retrieve information necessary to operate and confer functionality, at least in part, to communication platform or front end 404, the phase locked loop system 410 and substantially any other operational aspects of the phase locked loop system 410. The phase locked loop system 410 includes at least one oscillator (e.g., a VCO, DCO or the like) that can be calibrated via core voltage, a coarse tuning value, signal, word or selection process.

The processor 402 can operate to enable the mobile communication device 400 to process data (e.g., symbols, bits, or chips) for multiplexing/demultiplexing with the mux/demux component 412, or modulation/demodulation via the mod/demod component 414, such as implementing direct and inverse fast Fourier transforms, selection of modulation rates, selection of data packet formats, interpacket times, etc. Memory 403 can store data structures (e.g., metadata), code structure(s) (e.g., modules, objects, classes, procedures, or the like) or instructions, network or device information such as policies and specifications, attachment protocols, code sequences for scrambling, spreading and pilot (e.g., reference signal(s)) transmission, frequency offsets, cell IDs, and other data for detecting and identifying various characteristics related to RF input signals, a power output or other signal components during power generation.

Figure 1:
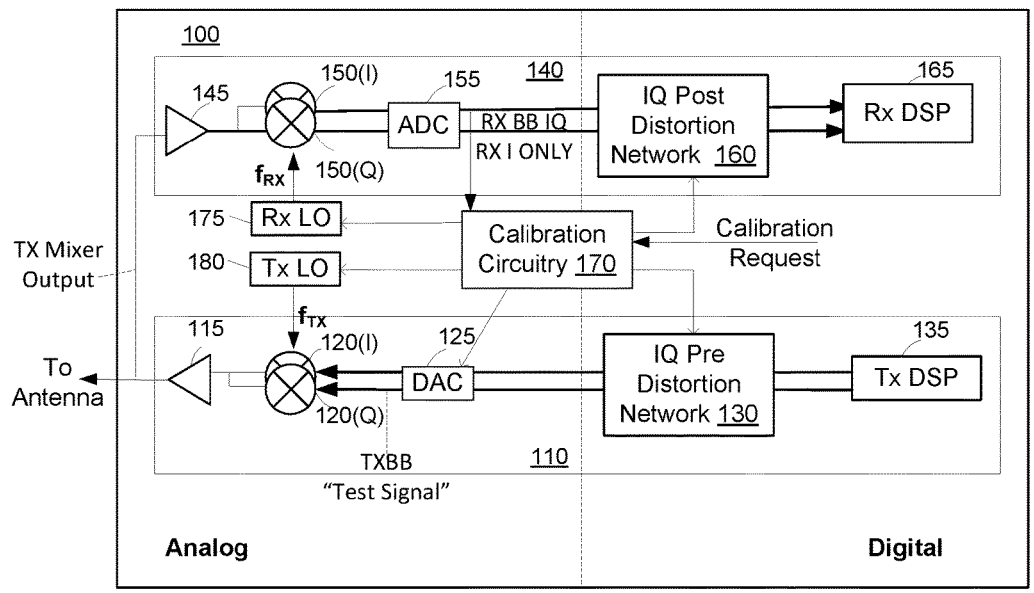
FIG. 1 illustrates a transceiver system that includes one exemplary implementation of calibration circuitry configured to calibrate a transceiver by using a receiver local oscillator signal that is different from a transmitter local oscillator signal.

FIG. 1 illustrates an exemplary implementation of a quadrature transceiver 100 that includes electronic signal processing components associated with a transmitter 110 and electronic signal processing components associated with a receiver 140. The transceiver 100 also includes calibration circuitry 170 that is configured to control various aspects of operation of the transceiver during calibration. For example, the calibration circuitry 170 is capable of controlling RX local oscillator (LO) circuitry 175 and TX LO circuitry 180 to generate local oscillator signals having different frequencies. The separation, or difference, in frequency between the RX LO signal and the TX LO signal during calibration will be referred to herein as the intermediate frequency (IF). In one exemplary implementation, the calibration circuitry 170 is embodied as a processor executing instructions combined with control logic. For example, the calibration circuitry 170 may be embodied as a radio controller.

The transmitter 110 includes digital signal processing (DSP) 135 components that, during normal operation, convert information to be transmitted into a TX baseband signal. An IQ pre-distortion network 130 adjusts the gain and/or phase of the signal output by the TX DSP 135 to pre-compensate for errors that will be introduced by the transmitter components. Because the transceiver 100 is a quadrature transceiver, the transmitter 110 includes two parallel signal processing paths: an I path on which the in-phase signal component flows and a Q path on which the quadrature signal component flows.

The transmitter 110 includes, in the analog domain, a digital to analog converter (DAC) 125 and two TX mixers 120I, 120Q. The DAC 125 converts the digital TX baseband single to an analog baseband signal. The TX mixers 120 upconvert the TX baseband signal by mixing 90 degree out of phase TX LO signals from the TX LO circuitry 180 with the digital baseband signal to generate a transmit signal. During normal operation, the transmit signal is amplified by a power amplifier 115 for transmission by an antenna (not shown). During calibration, the transmit signal is looped back to the receiver 140.

The receiver 140 includes, in the analog domain, two RX mixers 150(I), 150(Q) and an analog to digital converter (ADC) 155. During normal operation a low noise amplifier (LNA) (not shown) amplifies an RF signal received from the antenna. The amplified signal is input to the RX mixers 150. During calibration, the RF signal from the power amplifier 115 is input to the RX mixers 150 by way of a loopback amplifier 145. The RX mixers downconvert the RF signal by mixing 90 degree out of phase RX LO signals with the amplified RF signal to generate RX baseband I and Q signals. The RX baseband signals are converted to digital signals by the ADC 155 to generate a received signal.

In calibration mode, the received signal is the calibration signal, which is labeled RX BB IQ/RX I ONLY in FIG. 1. RX BB IQ refers to both the I component of the received signal and the Q component of the received signal. RX I ONLY refers to only the I signal component of the received signal. Exemplary implementations that use the RX BB IQ signal for calibration, referred to as "full loopback" calibration will be described first. Exemplary implementations that use the RX I ONLY signal for calibration will be described in more detail below. In the digital domain, the receiver 140 includes IQ post distortion network circuitry 160 and RX DSP components 165. The RX DSP components 165 extract information from the received signal after the received signal has been corrected in phase/and or gain by the IQ post distortion network 160.

FIG. 1 illustrates the transceiver 100 being controlled by calibration circuitry 170 to operate in a calibration mode in which the calibration circuitry 170 is calculating or determining settings for electronic components in the IQ pre-distortion network 130 and the IQ post-distortion network 160. During calibration, the networks 130, 160 are configured to correct for the phase imbalance E and the gain imbalance $\Delta\varphi$ that are introduced by the different components in the I and Q processing paths. In other words, the networks 130, 160 are configured to impose a phase imbalance and a gain imbalance which should be the opposite of the errors introduced by the transceiver components. In general, for the purposes of correction calculations, the terms $\alpha$ and $\beta$ (referred to herein a "correction parameters") are used. $\alpha$ and $\beta$ can be expressed in terms of $\epsilon$ and $\Delta\varphi$ as follows:

$$\alpha = \cos \Delta\varphi + j\epsilon \sin \Delta\varphi \qquad \text{EQ. 1}$$

$$\beta = \epsilon \cos \Delta\varphi - j \sin \Delta\varphi \qquad \text{EQ. 2}$$

For example, if the phase imbalance $\Delta\varphi$ between I and Q in the RX is about 5 degrees and the gain imbalance E results from I being higher than Q by about 0.3 dB (gain imbalance) the post distortion network 130 should be configured to impose phase imbalance of about minus 5 degrees and a gain imbalance of about minus 0.3 dB. The purpose of the calibration is to estimate transmitter correction values $\alpha_{TX}$ and $\beta_{TX}$ which are used to adjust the pre-distortion network 130 and receiver correction values $\alpha_{RX}$ and $\beta_{RX}$ which are used to adjust the post-distortion network 160 by measurements of the calibration signal.

The calibration circuitry 170 is triggered to begin the calibration process by receiving a calibration request. In one exemplary implementation, the calibration request is a signal generated during start up of the transceiver. Calibration requests may be generated or triggered at other times, such as when changes in the transceiver's temperature are detected, or when other criteria are met.

During calibration, the calibration circuitry 170 controls the RX LO circuitry 175 to generate an RX LO signal having a frequency of $f_{RXLO}$ and the TX LO circuitry to generate a TX LO signal having a frequency of $f_{TXLO}$. The frequencies $f_{RXLO}$ and $f_{TXLO}$ are different from one another and are separated from one another by an intermediate frequency $f_{IF}$. Thus $f_{IF}$ is equal to the absolute value of $f_{TXLO}-f_{RXLO}$. In one exemplary implementation, $f_{IF}$ is on the order of about 2-20 MHz. The calibration circuitry 170 controls the DAC 125 in the transmitter to transmit a test signal. In one exemplary implementation, the test signal (also labeled TX BB) is a continuous wave, such as a cosine wave. In other exemplary implementations, the test signal is another modulated signal with known properties. The calibration circuitry 170 also controls transceiver components to close the loopback path between the output of the transmitter and the input of the receiver so that the amplified output of the TX mixer is input to the loopback amplifier 145.

Figure 2:
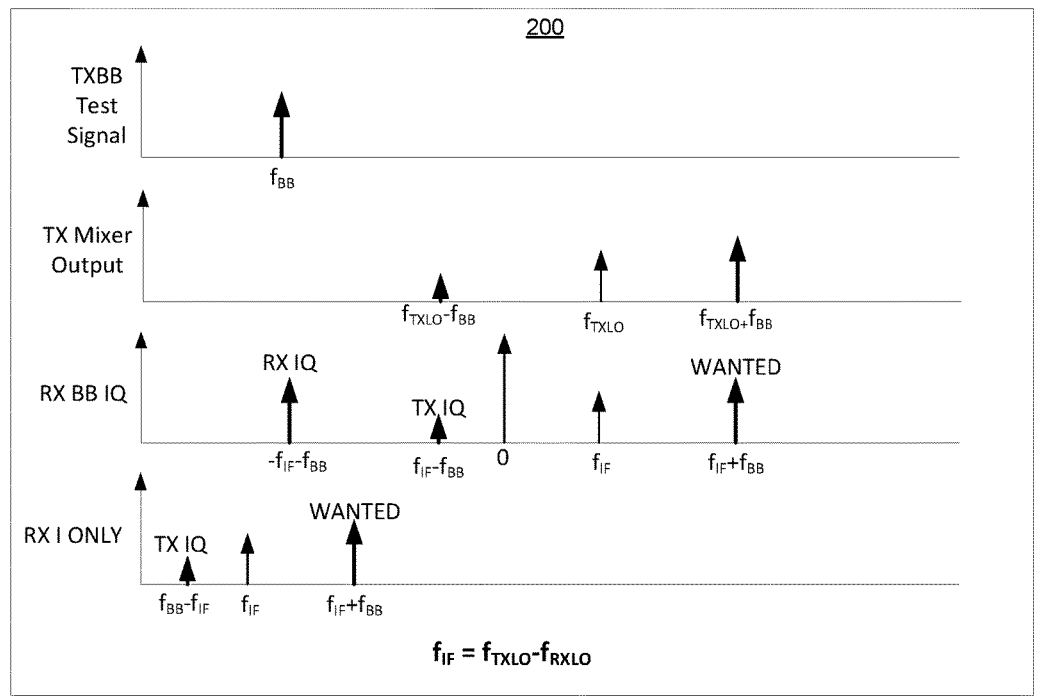
FIG. 2 is a spectrum diagram that illustrates frequency components of signals within the transceiver of FIG. 1 during calibration.

FIG. 2 is a spectrum diagram that illustrates selected frequency components in various signals present in the transceiver 100 during calibration mode. The mathematical representation of IQ impairments on a signal is as follows:

$$S_{IQ}(f) = \alpha S(f) + \beta S^*(-f) \qquad \text{EQ. 1}$$

The signal $S_{IQ}(f)$ is the spectrum of the distorted signal, $S(f)$ is the input signal, and $S^*(-f)$ is the conjugate of the input signal at frequency f. The correction parameters $\alpha$ and $\beta$ are the complex coefficients of the IQ impairments. Because $\alpha$ and $\beta$ are complex, it is enough to know the ratio between them in order to extract the phase and gain imbalance to be compensated for by the pre-distortion network 130 and the post distortion network 160. The signal TX BB is the continuous wave (or other test signal) generated by the DAC 125 during calibration. The significant frequency component of the test signal is at the baseband frequency $f_{BB}$.

The test signal TX BB is upconverted using frequency $f_{TXLO}$ by the TX mixers 120I and 120Q. IQ impairments are introduced into the transmit signal path by the electronic components in the transmitter 110, such as phase or gain differences in the TX mixers or the amplifier 115. Thus the upconverted TX BB signal at the TX mixer signal output has a primary component at frequency $f_{TXLO}+f_{BB}$ and also an image component at frequency $f_{TXLO}-f_{BB}$.

The upconverted test signal is looped back to the receiver mixers 150I, 150Q to be downconverted. Recall that the TX mixers and the RX mixers are fed by different frequencies that satisfy $f_{TXLO}-f_{RXLO}=f_{IF}$. The output of the ADC 155, which is the digital signal corresponding to the output of the RX mixers is shown in FIG. 2 as RX BB IQ. The wanted signal component of the received signal has a frequency of $f_{IF}+f_{BB}$. The TX IQ image signal component, which was created by the TX IQ mismatch being downconverted by the RX mixer is located at frequency $f_{IF}-f_{BB}$. The RX IQ image signal component resulting from the RX IQ impairments is located at frequency $-f_{IF}-f_{BB}$. Thus, the TX image component and the RX image component are separated by the intermediate frequency $f_{IF}$ in the calibration signal (which is the output of the receiver ADC during calibration using different RXLO and TXLO frequencies).

The mathematical representation of the test signal at the TX BB ($S_{TXBB}$) is:

$$S_{TXBB} = S\delta(f_{BB}) \qquad \text{EQ. 2}$$

The mathematical representation of the TX mixers' output ($S_{TXRF}$) is:

$$S_{TXRF} = \alpha_{TX} S\delta(f_{TXLO}+f_{BB}) + \beta_{TX} S^* \delta(f_{TXLO}-f_{BB}) \qquad \text{EQ. 3}$$

where $\alpha_{TX}$ and $\beta_{TX}$ quantify the impairments introduced by the electronic components in the transmitter 110. The mathematical representation of the RX mixers' output RX BB IQ (at the output of the ADC 155) ($S_{RXBB}$) is:

$$S_{RXBB} = \alpha_{TX}\alpha_{RX} S\delta(f_{IF}+f_{BB}) + \alpha_{RX}\beta_{TX} S^*\delta(f_{IF}-f_{BB}) + \alpha_{TX}\beta_{RX} S^*\delta(-f_{IF}-f_{BB}) + \beta_{RX}(\beta_{TX}S^*)^*\delta(-f_{IF}+f_{BB}) \qquad \text{EQ. 4}$$

where $\alpha_{RX}$ and $\beta_{RX}$ quantify the impairments introduced by the electronic components in the receiver 140. The factor $\beta_{RX}(\beta_{TX}S^*)^*\delta(-f_{IF}+f_{BB})$ is negligible and will not be considered during calibration.

Given the calibration signal RX BB IQ of EQ 4, which is the output of the ADC 155 during calibration using different TXLO and RXLO frequencies, many different techniques may be used by the calibration circuitry 170 to determine the values of the correction values $\alpha_{TX}$ and $\beta_{TX}$ and $\alpha_{RX}$ and $\beta_{RX}$. In one exemplary implementation, the calibration circuitry 170 includes correlators or filters that are used to separate out the three signal components RX IQ, TX IQ, and RX WANTED from the calibration signal produced by the ADC 155. The values of the correlators $I_{RX\ WANTED}$, $I_{TX}$ and $I_{RX}$, which are the values of the FFT in the frequencies $f_{IF}+f_{BB}$, $f_{IF}-f_{BB}$, and $-f_{IF}-f_{BB}$ are set as follows:

$$I_{RX\ WANTED} = \sum (I[n] + iQ[n]) e^{\frac{i2\pi(f_{IF}+f_{BB})}{SR}n} \qquad \text{EQ. 5}$$

$$I_{TX} = \sum (I[n] + iQ[n])e^{\frac{i2\pi(f_{IF}-f_{BB})}{SR}n} \qquad \text{EQ. 6}$$

$$I_{RX} = \sum (I[n] + iQ[n])e^{\frac{i2\pi(-f_{IF}-f_{BB})}{SR}n} \qquad \text{EQ. 7}$$

The output of the correlators can be used to determine the correction values based on the following relationships:

$$I_{RX\ WANTED} = \alpha_{TX}\alpha_{RX}S \qquad \text{EQ. 8}$$

$$I_{TX} = \alpha_{RX}\beta_{TX}S^* \qquad \text{EQ. 9}$$

$$I_{RX} = \alpha_{TX}\beta_{RX}S^* \qquad \text{EQ. 10}$$

Any of a number of algorithms can be used in order to extract the best compensation values for the correction values based on equations 8-10.

Another approach to calibrate the transceiver to compensate for IQ mismatch is by measuring the IQ rejection of the transceiver. The RX and TX IQ rejection, denoted as $IMRR_{RX}$ and $IMRR_{TX}$, respectively, can be expressed as:

$$IMRR_{RX} = 20\log_{10}\left|\frac{I_{RX}}{I_{RX\ WANTED}}\right| \qquad \text{EQ. 11}$$

$$IMRR_{TX} = 20\log_{10}\left|\frac{I_{TX}}{I_{RX\ WANTED}}\right| \qquad \text{EQ. 12}$$

It can be seen that both the TX IQ rejection and the RX IQ rejection can be computed from the three components of the calibration signal. The IMRR dependency in the distance of used correction values to the optimal value is deterministic. For example, the IMRR can be measured for few pre-defined test signal values and the correction values can be estimated from the measurements. For example, the IMRR has parabolic dependency in phase imbalance as follows:

$$IMRR = a(\text{phase}-\text{phase}^*)^2 + b(\text{phase}-\text{phase}^*) \qquad \text{EQ. 13}$$

It is sufficient to measure the IMRR for 3 different values of phase to extract phase* (which is the optimum) by using linear regression. The two algorithms presented above are just two of the possible ways to calibrate the transceiver using the calibration signal. The concept of TXLO and RXLO frequency separation during opens whole new ways to measure and calibrate IQ impairments.

In one exemplary implementation, only the I path of the receiver is used during calibration. In this exemplary implementation, the loopback path between the transmitter 110 and receiver 140 acts as a low IF receiver (which does not have IQ impairments because it has a single path). The I component of the received signal output by the ADC 155 (illustrated as RX I ONLY in FIG. 2) is used to calibrate the transmitter by calculating the transmitter correction values based on the I component of the received signal. For example, using only the I component of the received signal, the TX rejection $IMRR_{TX}$ can be measured for three different test signals with different phase values and $\alpha_{TX}$ and $\beta_{TX}$ can be computed using equations 12 and 13. Later the RX IQ can be calibrated using the calibrated TX.

Figure 3:
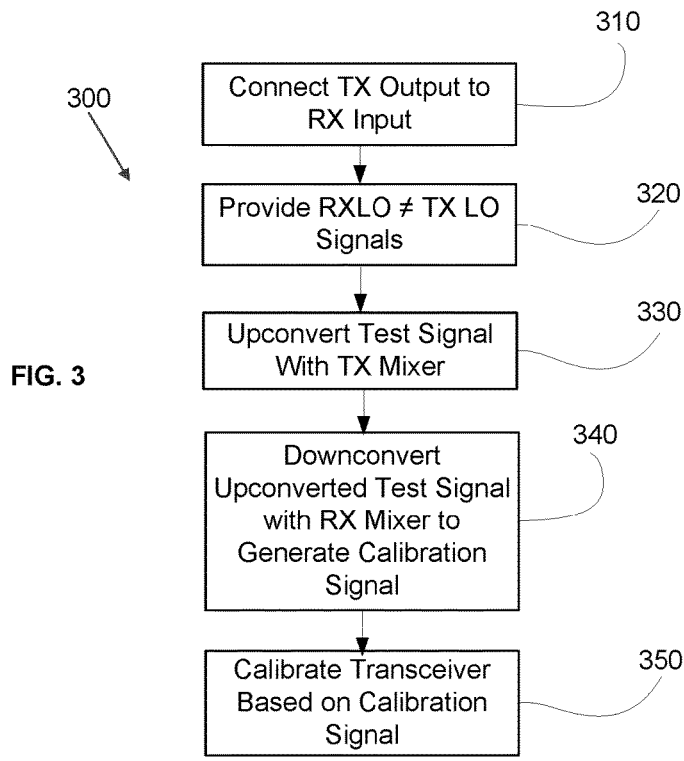
FIG. 3 illustrates one exemplary implementation of a method of calibrating a receiver using a receiver local oscillator signal different from a transmitter local oscillator signal.

FIG. 3 illustrates one exemplary implementation of a method 300 configured to calibrate a transceiver that comprises a transmitter and a receiver. The method 300 may be performed by the calibration circuitry 150 of FIG. 1 and/or the transceiver 100 of FIG. 1. The method includes, at 310, connecting an output of the transmitter to an input of the receiver. At 320, the method includes providing a receiver local oscillator signal having a receiver local oscillator frequency to a receiver mixer and providing a transmitter local oscillator signal having a transmitter local oscillator frequency to a transmitter mixer. The receiver local oscillator frequency is separated from the transmitter local oscillator frequency by a nonzero intermediate frequency. At 330, a test signal is upconverted with the transmitter mixer. At 340, the method includes, with the receiver mixer, downconverting the output signal of the transmitter mixer to generate a calibration signal. At 350, the transceiver is calibrated based at least on the calibration signal.

It can be seen from the foregoing description that performing closed loop transceiver calibration using different TXLO and RXLO frequencies provides the benefits of closed loop calibration while generating a calibration signal that already has the TX image and RX image signal components separated by an intermediate frequency. This simplifies calibration by requiring less processing and lower complexity components to calibrate by the transmitter and receiver.

Figure 5:
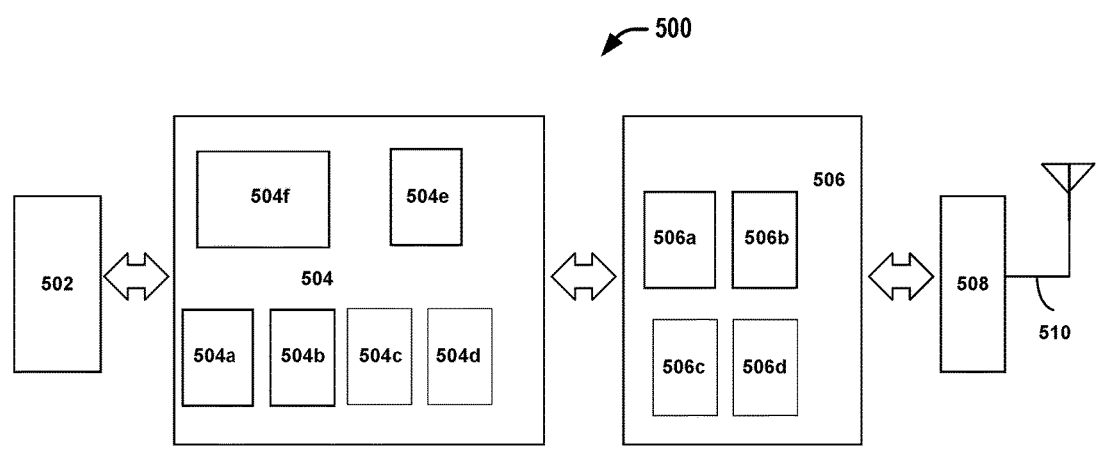
FIG. 5 illustrates example components of a device, according to one embodiment of the disclosure.

Embodiments described herein may be implemented into a system using any suitably configured hardware and/or software. FIG. 5 illustrates, for one embodiment, example components of a device 500. The device 500 may be utilized as a User Equipment (UE) device or an evolved node B (eNB) device or E-UTRAN equipment. In some embodiments, the device 500 may include application circuitry 502, baseband circuitry 504, Radio Frequency (RF) circuitry 506, front-end module (FEM) circuitry 508 and one or more antennas 510, coupled together at least as shown.

The application circuitry 502 may include one or more application processors. For example, the application circuitry 502 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 504 may include circuitry such as, but not limited to, one or more single-core or multi-core processors. The baseband circuitry 504 may include one or more baseband processors and/or control logic to process baseband signals received from a receive signal path of the RF circuitry 506 and to generate baseband signals for a transmit signal path of the RF circuitry 506. Baseband processing circuitry 504 may interface with the application circuitry 502 for generation and processing of the baseband signals and for controlling operations of the RF circuitry 506. For example, in some embodiments, the baseband circuitry 504 may include a second generation (2G) baseband processor 504a, third generation (3G) baseband processor 504b, fourth generation (4G) baseband processor 504c, and/or other baseband processor(s) 504d for other existing generations, generations in development or to be developed in the future (e.g., fifth generation (5G), 5G, etc.).

The baseband circuitry 504 (e.g., one or more of baseband processors 504a-d) may handle various radio control functions that enable communication with one or more radio networks via the RF circuitry 506. The radio control functions may include, but are not limited to, signal modulation/demodulation, encoding/decoding, radio frequency shifting, etc. In some embodiments, modulation/demodulation circuitry of the baseband circuitry 504 may include Fast-Fourier Transform (FFT), precoding, and/or constellation mapping/demapping functionality. In some embodiments, encoding/decoding circuitry of the baseband circuitry 504 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 504 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 504e of the baseband circuitry 504 may be configured to run elements of the protocol stack for signaling of the PHY, MAC, RLC, PDCP and/or RRC layers. In some embodiments, the baseband circuitry may include one or more audio digital signal processor(s) (DSP) 504f. The audio DSP(s) 504f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 504 and the application circuitry 502 may be implemented together such as, for example, on a system on a chip (SOC).

In some embodiments, the baseband circuitry 504 may provide for communication compatible with one or more radio technologies. For example, in some embodiments, the baseband circuitry 504 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 504 is configured to support radio communications of more than one wireless protocol may be referred to as multi-mode baseband circuitry.

RF circuitry 506 may enable communication with wireless networks using modulated electromagnetic radiation through a non-solid medium. In various embodiments, the RF circuitry 506 may include switches, filters, amplifiers, etc. to facilitate the communication with the wireless network. RF circuitry 506 may include a receive signal path which may include circuitry to down-convert RF signals received from the FEM circuitry 508 and provide baseband signals to the baseband circuitry 504. RF circuitry 506 may also include a transmit signal path which may include circuitry to up-convert baseband signals provided by the baseband circuitry 504 and provide RF output signals to the FEM circuitry 508 for transmission.

In some embodiments, the RF circuitry 506 may include a receive signal path and a transmit signal path. The receive signal path of the RF circuitry 506 may include mixer circuitry 506a, amplifier circuitry 506b and filter circuitry 506c. The transmit signal path of the RF circuitry 506 may include filter circuitry 506c and mixer circuitry 506a. RF circuitry 506 may also include synthesizer circuitry 506d for synthesizing a frequency for use by the mixer circuitry 506a of the receive signal path and the transmit signal path. In some embodiments, the mixer circuitry 506a of the receive signal path may be configured to down-convert RF signals received from the FEM circuitry 508 based on the synthesized frequency provided by synthesizer circuitry 506d. The amplifier circuitry 506b may be configured to amplify the down-converted signals and the filter circuitry 506c may be a low-pass filter (LPF) or band-pass filter (BPF) configured to remove unwanted signals from the down-converted signals to generate output baseband signals. Output baseband signals may be provided to the baseband circuitry 504 for further processing. In some embodiments, the output baseband signals may be zero-frequency baseband signals, although this is not a requirement. In some embodiments, mixer circuitry 506a of the receive signal path may comprise passive mixers, although the scope of the embodiments is not limited in this respect.

In some embodiments, the mixer circuitry 506a of the transmit signal path may be configured to up-convert input baseband signals based on the synthesized frequency provided by the synthesizer circuitry 506d to generate RF output signals for the FEM circuitry 508. The baseband signals may be provided by the baseband circuitry 504 and may be filtered by filter circuitry 506c. The filter circuitry 506c may include a low-pass filter (LPF), although the scope of the embodiments is not limited in this respect.

In some embodiments, the mixer circuitry 506a of the receive signal path and the mixer circuitry 506a of the transmit signal path may include two or more mixers and may be arranged for quadrature downconversion and/or upconversion respectively. In some embodiments, the mixer circuitry 506a of the receive signal path and the mixer circuitry 506a of the transmit signal path may include two or more mixers and may be arranged for image rejection (e.g., Hartley image rejection). In some embodiments, the mixer circuitry 506a of the receive signal path and the mixer circuitry 506a may be arranged for direct downconversion and/or direct upconversion, respectively. In some embodiments, the mixer circuitry 506a of the receive signal path and the mixer circuitry 506a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 506 may include analog-to-digital converter (ADC) and digital-to-analog converter (DAC) circuitry and the baseband circuitry 504 may include a digital baseband interface to communicate with the RF circuitry 506.

In some dual-mode embodiments, a separate radio IC circuitry may be provided for processing signals for each spectrum, although the scope of the embodiments is not limited in this respect.

In some embodiments, the synthesizer circuitry 506d may be a fractional-N synthesizer or a fractional N/N+1 synthesizer, although the scope of the embodiments is not limited in this respect as other types of frequency synthesizers may be suitable. For example, synthesizer circuitry 506d may be a delta-sigma synthesizer, a frequency multiplier, or a synthesizer comprising a phase-locked loop with a frequency divider.

The synthesizer circuitry 506d may be configured to synthesize an output frequency for use by the mixer circuitry 506a of the RF circuitry 506 based on a frequency input and a divider control input. In some embodiments, the synthesizer circuitry 506d may be a fractional N/N+1 synthesizer.

In some embodiments, frequency input may be provided by a voltage controlled oscillator (VCO), although that is not a requirement. Divider control input may be provided by either the baseband circuitry 504 or the applications processor 502 depending on the desired output frequency. In some embodiments, a divider control input (e.g., N) may be determined from a look-up table based on a channel indicated by the applications processor 502.

Synthesizer circuitry 506d of the RF circuitry 506 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 506d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 506 may include an IQ/polar converter.

FEM circuitry 508 may include a receive signal path which may include circuitry configured to operate on RF signals received from one or more antennas 510, amplify the received signals and provide the amplified versions of the received signals to the RF circuitry 506 for further processing. FEM circuitry 508 may also include a transmit signal path which may include circuitry configured to amplify signals for transmission provided by the RF circuitry 506 for transmission by one or more of the one or more antennas 510. When used in a UE device, FEM circuitry 508 may also include a transmit and receive path for device-to-device communications received directly from another UE device, without traveling through the E-UTRAN (e.g. ProSe interface circuitry). When used in a UE device, FEM circuitry 508 may also include a transmit and receive path for cellular communications received from the eNB or E-UTRAN (e.g. cellular interface circuitry).

In some embodiments, the FEM circuitry 508 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 906). The transmit signal path of the FEM circuitry 508 may include a power amplifier (PA) to amplify input RF signals (e.g., provided by RF circuitry 506), and one or more filters to generate RF signals for subsequent transmission (e.g., by one or more of the one or more antennas 510.

In some embodiments, the device 500 may include additional elements such as, for example, memory/storage, display, camera, sensor, and/or input/output (I/O) interface.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

The foregoing description of one or more implementations provides illustration and description, but is not intended to be exhaustive or to limit the scope of the exemplary implementations to the precise form disclosed. Modifications and variations are possible in light of the above teachings or may be acquired from practice of various implementations of the exemplary implementations.

Example 1 is a method configured to calibrate a transceiver that comprises a transmitter and a receiver. The method includes: connecting an output of the transmitter to an input of the receiver; providing a receiver local oscillator signal having a receiver local oscillator frequency (fRXLO) to a receiver mixer; and providing a transmitter local oscillator signal having a transmitter local oscillator frequency (fTXLO) to a transmitter mixer. The receiver local oscillator frequency is separated from the transmitter local oscillator frequency by a nonzero intermediate frequency (fIF). The method also includes upconverting a test signal having a baseband frequency (fBB) using the transmitter mixer; downconverting the output signal of the transmitter mixer with the receiver mixer to generate a calibration signal; and calibrating the transceiver based on the calibration signal.

Example 2 includes the subject matter of example 1, including or omitting optional elements, wherein calibrating the transceiver includes determining correction values for a pre-distortion network that adjusts the phase or gain of a baseband signal in the transmitter to compensate for errors introduced into a transmit signal by electronic components in the transmitter; and adjusting electronic components in the pre-distortion network based on the correction values.

Example 3 includes the subject matter of example 1, including or omitting optional elements, wherein the calibration signal comprises both an I component and a Q component of the downconverted output signal.

Example 4 includes the subject matter of examples 1-3, including or omitting optional elements, wherein calibrating the transceiver includes: identifying a receiver image signal component (RX IQ) in the calibration signal at a frequency of (−fIF−fBB); identifying a transmitter image signal component (TX IQ) in the calibration signal at a frequency of (fIF−fBB); identifying a wanted signal component (RX WANTED) in the calibration signal at a frequency of (fIF+fBB); and determining correction values for a pre-distortion network and a post-distortion network based at least on the RX IQ signal component, the TX IQ signal component, and the RX WANTED signal component.

Example 5 includes the subject matter of example 4, including or omitting optional elements, including solving simultaneous equations that express transmitter correction values and receiver correction values in terms of the TX IQ signal component, RX IQ signal component, RX WANTED signal component, and the test signal.

Example 6 includes the subject matter of example 4, including or omitting optional elements, including determining IQ rejection of the transmitter based at least on the TX IQ signal and RX WANTED signal component; determining IQ rejection of the receiver based at least on the RX IQ signal and RX WANTED signal component; and calibrating the transceiver based at least on the IQ rejection of the transmitter and the IQ rejection of the transceiver.

Example 7 includes the subject matter of example 1, including or omitting optional elements, wherein the calibration signal comprises an I component of the downconverted output signal.

Example 8 is a calibration system, configured to calibrate a transceiver having a transmitter and a receiver, that includes a transmitter mixer; a transmitter local oscillator operatively connected to the transmitter mixer; a receiver mixer; a receiver local oscillator operatively connected to the receiver mixer; and calibration circuitry operatively connected to the transmitter local oscillator and the receiver local oscillator. The calibration circuitry is configured to control one or more transceiver components to connect an output of the transmitter to an input of the receiver; control the transmitter local oscillator to provide a transmitter local oscillator signal having a transmitter local oscillator frequency ($f_{TXLO}$) to a transmitter mixer to cause the transmitter mixer to upconvert a test signal having a baseband frequency ($f_{BB}$) to generate an output signal; control the receiver local oscillator to provide a receiver local oscillator signal having a receiver local oscillator frequency ($f_{RXLO}$) to the receiver mixer to cause the receiver mixer to downconvert the output signal of the transmitter mixer to generate a calibration signal. The receiver local oscillator frequency is separated from the transmitter local oscillator frequency by a nonzero intermediate frequency ($f_{IF}$). The calibration circuitry is configured to calibrate the transceiver based at least on the calibration signal.

Example 9 includes the subject matter of example 8, including or omitting optional elements, wherein the calibration circuitry is further configured to calibrate the transceiver by: determining correction values for a pre-distortion network that adjusts the phase or gain of a baseband signal in the transmitter to compensate for errors introduced into a transmit signal by electronic components in the transmitter; and adjusting electronic components in the pre-distortion network based on the correction values.

Example 10 includes the subject matter of example 8, including or omitting optional elements, wherein the calibration signal comprises both an I component and a Q component of the downconverted output signal Example 11 includes the subject matter of examples 8-10, including or omitting optional elements, wherein the calibration circuitry is further configured to calibrate the transceiver by: identifying a receiver image signal component (RX IQ) in the calibration signal at a frequency of (−fIF−fBB); identifying a transmitter image signal component (TX IQ) in the calibration signal at a frequency of (fIF−fBB); identifying a wanted signal component (RX WANTED) in the calibration signal at a frequency of (fIF+fBB); and determining correction values for a pre-distortion network and a post-distortion network based at least on the RX IQ signal component, the TX IQ signal component, and the RX WANTED signal component.

Example 12 includes the subject matter of example 11, including or omitting optional elements, wherein the calibration circuitry is further configured to solve simultaneous equations that express transmitter correction values and receiver correction values in terms of the TX IQ signal component, RX IQ signal component, RX WANTED signal component, and the test signal.

Example 13 includes the subject matter of example 11, including or omitting optional elements, wherein the calibration circuitry is further configured to: determine IQ rejection of the transmitter based at least on the TX IQ signal and RX WANTED signal component; determine IQ rejection of the receiver based at least on the RX IQ signal and RX WANTED signal component; and calibrate the transceiver based at least on the IQ rejection of the transmitter and the IQ rejection of the transceiver.

Example 14 includes the subject matter of example 8, including or omitting optional elements, wherein the calibration signal comprises an I component of the downconverted output signal.

Example 15 is a transceiver that includes a transmitter having an output; a receiver having an input, and calibration circuitry, coupled to the transmitter and the receiver, configured to control one or more transceiver components to connect the output of the transmitter to the input of the receiver. A receiver local oscillator is coupled to and controlled by the calibration circuitry to provide a receiver local oscillator signal having a receiver local oscillator frequency (fRXLO) to a receiver mixer. A transmitter local oscillator is coupled to and controlled by the calibration circuitry to provide a transmitter local oscillator signal having a transmitter local oscillator frequency (fTXLO) to a transmitter mixer. The receiver local oscillator frequency is separated from the transmitter local oscillator frequency by a nonzero intermediate frequency (fIF). The calibration circuitry is configured to: control the transmitter mixer to upconvert a test signal having a baseband frequency (fBB), control the receiver mixer to downconvert the output signal of the transmitter mixer to generate a calibration signal, and calibrate the transceiver based at least on the calibration signal.

Example 16 includes the subject matter of example 15, including or omitting optional elements, wherein the calibration circuitry is further configured to calibrate the transceiver by: determining correction values for a pre-distortion network that adjusts the phase or gain of a baseband signal in the transmitter to compensate for errors introduced into a transmit signal by electronic components in the transmitter; and adjusting electronic components in the pre-distortion network based on the correction values.

Example 17 includes the subject matter of example 15, including or omitting optional elements, wherein the calibration signal comprises both an I component and a Q component of the downconverted output signal.

Example 18 includes the subject matter of examples 15-17, including or omitting optional elements, wherein the calibration circuitry is further configured to calibrate the transceiver by: identifying a receiver image signal component (RX IQ) in the calibration signal at a frequency of (−fIF−fBB); identifying a transmitter image signal component (TX IQ) in the calibration signal at a frequency of (fIF−fBB); identifying a wanted signal component (RX WANTED) in the calibration signal at a frequency of (fIF+fBB); and determining correction values for a pre-distortion network and a post-distortion network based at least on the RX IQ signal component, the TX IQ signal component, and the RX WANTED signal component.

Example 19 includes the subject matter of example 18, including or omitting optional elements, wherein the calibration circuitry is further configured to solve simultaneous equations that express transmitter correction values and receiver correction values in terms of the TX IQ signal component, RX IQ signal component, RX WANTED signal component, and the test signal.

Example 20 includes the subject matter of example 18, including or omitting optional elements, wherein the calibration circuitry is further configured to: determine IQ rejection of the transmitter based at least on the TX IQ signal and RX WANTED signal component; determine IQ rejection of the receiver based at least on the RX IQ signal and RX WANTED signal component; and calibrate the transceiver based at least on the IQ rejection of the transmitter and the IQ rejection of the transceiver.

Example 21 includes the subject matter of example 15, including or omitting optional elements, wherein the calibration signal comprises an I component of the downconverted output signal.

Example 22 is an apparatus, including: means for connecting an output of a transmitter to an input of a receiver; means for providing a receiver local oscillator signal having a receiver local oscillator frequency (fRXLO) to a receiver mixer; and means for providing a transmitter local oscillator signal having a transmitter local oscillator frequency (fTXLO) to a transmitter mixer. The receiver local oscillator frequency is separated from the transmitter local oscillator frequency by a nonzero intermediate frequency (fIF). The apparatus includes means for generating a calibration signal by: upconverting a test signal having a baseband frequency (fBB) with the transmitter mixer; and with the receiver mixer, downconverting the output signal of the transmitter mixer to generate a calibration signal; and means for calibrating the transceiver based at least on the calibration signal.

Example 23 includes the subject matter of example 22, including or omitting optional elements, wherein the calibration signal comprises both an I component and a Q component of the downconverted output signal.

Example 24 includes the subject matter of example 22, including or omitting optional elements, wherein the calibration signal comprises an I component of the downconverted output signal.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine.

The above description of illustrated exemplary implementations of the subject disclosure, including what is described in the Abstract, is not intended to be exhaustive or to limit the disclosed exemplary implementations to the precise forms disclosed. While specific exemplary implementations and examples are described herein for illustrative purposes, various modifications are possible that are considered within the scope of such exemplary implementations and examples, as those skilled in the relevant art can recognize.

In this regard, while the disclosed subject matter has been described in connection with various exemplary implementations and corresponding Figures, where applicable, it is to be understood that other similar exemplary implementations can be used or modifications and additions can be made to the described exemplary implementations for performing the same, similar, alternative, or substitute function of the disclosed subject matter without deviating therefrom. Therefore, the disclosed subject matter should not be limited to any single exemplary implementation described herein, but rather should be construed in breadth and scope in accordance with the appended claims below.

In the present disclosure like reference numerals are used to refer to like elements throughout, and wherein the illustrated structures and devices are not necessarily drawn to scale. As utilized herein, terms "module", "component," "system," "circuit," "circuitry," "element," "slice," and the like are intended to refer to a computer-related entity, hardware, software (e.g., in execution), and/or firmware. For example, circuitry or a similar term can be a processor, a process running on a processor, a controller, an object, an executable program, a storage device, and/or a computer with a processing device. By way of illustration, an application running on a server and the server can also be circuitry. One or more circuitries can reside within a process, and circuitry can be localized on one computer and/or distributed between two or more computers. A set of elements or a set of other circuitry can be described herein, in which the term "set" can be interpreted as "one or more."

As another example, circuitry or similar term can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, circuitry can be an apparatus that provides specific functionality through electronic components without mechanical parts; the electronic components can include one or more processors therein to execute software and/or firmware that confer(s), at least in part, the functionality of the electronic components.

It will be understood that when an element is referred to as being "electrically connected" or "electrically coupled" or "operatively connected" to another element, it can be physically connected or coupled to the other element such that current and/or electromagnetic radiation can flow along a conductive path formed by the elements. Intervening conductive, inductive, or capacitive elements may be present between the element and the other element when the elements are described as being electrically coupled or connected to one another. Further, when electrically coupled or connected to one another, one element may be capable of inducing a voltage or current flow or propagation of an electro-magnetic wave in the other element without physical contact or intervening components. Further, when a voltage, current, or signal is referred to as being "applied" to an element, the voltage, current, or signal may be conducted to the element by way of a physical connection or by way of capacitive, electro-magnetic, or inductive coupling that does not involve a physical connection.

Use of the word exemplary is intended to present concepts in a concrete fashion. The terminology used herein is for the purpose of describing particular examples only and is not intended to be limiting of examples. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

The invention claimed is:

1. A method configured to calibrate a transceiver that comprises a transmitter and a receiver, the method comprising:
    connecting an output of the transmitter to an input of the receiver;
    providing a receiver local oscillator signal having a receiver local oscillator frequency ($f_{RXLO}$) to a receiver mixer;
    providing a transmitter local oscillator signal having a transmitter local oscillator frequency ($f_{TXLO}$) to a transmitter mixer;
    wherein the receiver local oscillator frequency is separated from the transmitter local oscillator frequency by a nonzero intermediate frequency ($f_{IF}$);
    upconverting a test signal having a baseband frequency ($f_{BB}$) using the transmitter mixer;
    downconverting the output signal of the transmitter mixer using the receiver mixer to generate a calibration signal; and
    calibrating the transceiver based on the calibration signal.

2. The method of claim 1, wherein calibrating the transceiver comprises:
    determining correction values for a pre-distortion network that adjusts the phase or gain of a baseband signal in the transmitter to compensate for errors introduced into a transmit signal by electronic components in the transmitter; and
    adjusting electronic components in the pre-distortion network based on the correction values.

3. The method of claim 1, wherein the calibration signal comprises both an I component and a Q component of the downconverted output signal.

4. The method of claim 1, wherein calibrating the transceiver comprises:
    identifying a receiver image signal component (RX IQ) in the calibration signal at a frequency of ($-f_{IF}-f_{BB}$);
    identifying a transmitter image signal component (TX IQ) in the calibration signal at a frequency of ($f_{IF}-f_{BB}$);
    identifying a wanted signal component (RX WANTED) in the calibration signal at a frequency of ($f_{IF}+f_{BB}$); and
    determining correction values for a pre-distortion network and a post-distortion network based at least on the RX IQ signal component, the TX IQ signal component, and the RX WANTED signal component.

5. The method of claim 4, comprising solving simultaneous equations that express transmitter correction values and receiver correction values in terms of the TX IQ signal component, RX IQ signal component, RX WANTED signal component, and the test signal.

6. The method of claim 4, comprising:
    determining IQ rejection of the transmitter based at least on the TX IQ signal and RX WANTED signal component;
    determining IQ rejection of the receiver based at least on the RX IQ signal and RX WANTED signal component; and
    calibrating the transceiver based at least on the IQ rejection of the transmitter and the IQ rejection of the receiver.

7. The method of claim 1, wherein the calibration signal comprises an I component of the downconverted output signal.

8. A calibration system, configured to calibrate a transceiver having a transmitter and a receiver, comprising:
    a transmitter mixer;
    a transmitter local oscillator operatively connected to the transmitter mixer;
    a receiver mixer;
    a receiver local oscillator operatively connected to the receiver mixer; and
    calibration circuitry operatively connected to the transmitter local oscillator and the receiver local oscillator, the calibration circuitry configured to:
        control one or more transceiver components to connect an output of the transmitter to an input of the receiver;
        control the transmitter local oscillator to provide a transmitter local oscillator signal having a transmitter local oscillator frequency ($f_{TXLO}$) to a transmitter mixer to cause the transmitter mixer to upconvert a test signal having a baseband frequency ($f_{BB}$) to generate an output signal;
        control the receiver local oscillator to provide a receiver local oscillator signal having a receiver local oscillator frequency ($f_{RXLO}$) to the receiver mixer to cause the receiver mixer to downconvert the output signal of the transmitter mixer to generate a calibration signal;
        wherein the receiver local oscillator frequency is separated from the transmitter local oscillator frequency by a nonzero intermediate frequency ($f_{IF}$); and
        calibrate the transceiver based at least on the calibration signal.

9. The calibration system of claim 8, wherein the calibration circuitry is further configured to calibrate the transceiver by:
    determining correction values for a pre-distortion network that adjusts the phase or gain of a baseband signal in the transmitter to compensate for errors introduced into a transmit signal by electronic components in the transmitter; and
    adjusting electronic components in the pre-distortion network based on the correction values.

10. The calibration system of claim 8, wherein the calibration signal comprises both an I component and a Q component of the downconverted output signal.

11. The calibration system of claim 8, wherein the calibration circuitry is further configured to calibrate the transceiver by:
    identifying a receiver image signal component (RX IQ) in the calibration signal at a frequency of ($-f_{IF}-f_{BB}$);
    identifying a transmitter image signal component (TX IQ) in the calibration signal at a frequency of ($f_{IF}-f_{BB}$);
    identifying a wanted signal component (RX WANTED) in the calibration signal at a frequency of ($f_{IF}+f_{BB}$); and
    determining correction values for a pre-distortion network and a post-distortion network based at least on the RX IQ signal component, the TX IQ signal component, and the RX WANTED signal component.

12. The calibration system of claim 11, wherein the calibration circuitry is further configured to solve simultaneous equations that express transmitter correction values and receiver correction values in terms of the TX IQ signal component, RX IQ signal component, RX WANTED signal component, and the test signal.

13. The calibration system of claim 11, wherein the calibration circuitry is further configured to:
   determine IQ rejection of the transmitter based at least on the TX IQ signal and RX WANTED signal component;
   determine IQ rejection of the receiver based at least on the RX IQ signal and RX WANTED signal component; and
   calibrate the transceiver based at least on the IQ rejection of the transmitter and the IQ rejection of the transceiver.

14. The calibration system of claim 8, wherein the calibration signal comprises an I component of the downconverted output signal.

15. A transceiver, comprising:
   a transmitter having an output;
   a receiver having an input; and
   calibration circuitry, coupled to the transmitter and the receiver, configured to control one or more transceiver components to connect the output of the transmitter to the input of the receiver;
   a receiver local oscillator coupled to and controlled by the calibration circuitry to provide a receiver local oscillator signal having a receiver local oscillator frequency ($f_{RXLO}$) to a receiver mixer;
   a transmitter local oscillator coupled to and controlled by the calibration circuitry to provide a transmitter local oscillator signal having a transmitter local oscillator frequency ($f_{TXLO}$) to a transmitter mixer;
   wherein the receiver local oscillator frequency is separated from the transmitter local oscillator frequency by a nonzero intermediate frequency ($f_{IF}$);
   wherein the calibration circuitry is configured to:
      control the transmitter mixer to upconvert a test signal having a baseband frequency ($f_{BB}$),
      control the receiver mixer to downconvert the output signal of the transmitter mixer to generate a calibration signal, and
      calibrate the transceiver based at least on the calibration signal.

16. The transceiver of claim 15, wherein the calibration circuitry is further configured to calibrate the transceiver by:
   determining correction values for a pre-distortion network that adjusts the phase or gain of a baseband signal in the transmitter to compensate for errors introduced into a transmit signal by electronic components in the transmitter; and
   adjusting electronic components in the pre-distortion network based on the correction values.

17. The transceiver of claim 15, wherein the calibration signal comprises both an I component and a Q component of the downconverted output signal.

18. The transceiver of claim 15, wherein the calibration circuitry is further configured to calibrate the transceiver by:
   identifying a receiver image signal component (RX IQ) in the calibration signal at a frequency of ($-f_{IF}-f_{BB}$);
   identifying a transmitter image signal component (TX IQ) in the calibration signal at a frequency of ($f_{IF}-f_{BB}$);
   identifying a wanted signal component (RX WANTED) in the calibration signal at a frequency of ($f_{IF}+f_{BB}$); and
   determining correction values for a pre-distortion network and a post-distortion network based at least on the RX IQ signal component, the TX IQ signal component, and the RX WANTED signal component.

19. The transceiver of claim 18, wherein the calibration circuitry is further configured to solve simultaneous equations that express transmitter correction values and receiver correction values in terms of the TX IQ signal component, RX IQ signal component, RX WANTED signal component, and the test signal.

20. The transceiver of claim 18, wherein the calibration circuitry is further configured to:
   determine IQ rejection of the transmitter based at least on the TX IQ signal and RX WANTED signal component;
   determine IQ rejection of the receiver based at least on the RX IQ signal and RX WANTED signal component; and
   calibrate the transceiver based at least on the IQ rejection of the transmitter and the IQ rejection of the transceiver.

21. The transceiver of claim 15, wherein the calibration signal comprises an I component of the downconverted output signal.

* * * * *